US012031323B1

(12) United States Patent
Chakravarthi

(10) Patent No.: US 12,031,323 B1
(45) Date of Patent: Jul. 9, 2024

(54) AUTOMATED SMART ROOFING SYSTEMS

(71) Applicant: Ananya Chakravarthi, Lucas, TX (US)

(72) Inventor: Ananya Chakravarthi, Lucas, TX (US)

( * ) Notice: Subject to any disclaimer, the term of this patent is extended or adjusted under 35 U.S.C. 154(b) by 0 days.

(21) Appl. No.: 18/443,125

(22) Filed: Feb. 15, 2024

(51) Int. Cl.
*E04B 1/92* (2006.01)
*E06B 9/68* (2006.01)

(52) U.S. Cl.
CPC ........ *E04B 1/92* (2013.01); *E06B 2009/6818* (2013.01)

(58) Field of Classification Search
CPC ...... E04B 1/92; E06B 2009/6818; E06B 9/32; E06B 9/68; E06B 9/08; E06B 2009/2476; E05F 15/71
See application file for complete search history.

(56) References Cited

U.S. PATENT DOCUMENTS

| | | | | |
|---|---|---|---|---|
| 5,675,487 A | | 10/1997 | Patterson et al. | |
| 6,084,231 A | | 7/2000 | Popat | |
| 7,941,245 B1 | | 5/2011 | Popat | |
| 9,091,115 B2 | | 7/2015 | Mullet | |
| 9,273,514 B2 | | 3/2016 | Hodgson | |
| 9,322,211 B2 | | 4/2016 | Birkestrand | |
| 10,104,997 B2 | | 10/2018 | Pham et al. | |
| 11,719,037 B2 | * | 8/2023 | Farnes | E04D 13/0325 454/196 |
| 2006/0000558 A1 | * | 1/2006 | Fennell | E05F 15/71 160/7 |
| 2011/0066302 A1 | * | 3/2011 | McEwan | E06B 9/32 700/295 |
| 2014/0027069 A1 | * | 1/2014 | Oppizzi | E06B 9/40 160/6 |
| 2022/0221183 A1 | * | 7/2022 | Huang | E06B 9/322 |
| 2023/0139451 A1 | * | 5/2023 | Krarti | E06B 9/38 49/25 |
| 2023/0235624 A1 | | 7/2023 | Buccola, Jr. et al. | |

FOREIGN PATENT DOCUMENTS

| | | | | | |
|---|---|---|---|---|---|
| EP | 1816308 A2 | * | 8/2007 | E06B 9/11 |
| EP | 2362052 A2 | * | 8/2011 | E04F 10/0659 |
| WO | 2009087512 A1 | | 7/2009 | |

OTHER PUBLICATIONS

Machine translation EP1816308 (Year: 2007).*

* cited by examiner

*Primary Examiner* — Abe Massad
*Assistant Examiner* — Jeremy C Ramsey

(57) ABSTRACT

A smart integrated roofing system includes a housing configured to protect components of the roofing system; an extensible tensioned fabric disposed in the housing; a roller configured to regulate the extensible tensioned fabric within the housing in a retracted position and deploy the fabric in an open position; an electric motor disposed in the housing and configured to actuate an operation of the roller. The system includes a light sensor is configured to detect sunlight intensity; a microcontroller configured to control an operation of the electric motor based on the detected sunlight intensity, a wind sensor is configured to detect wind speed, a rain sensor is configured to detect rainfall, a retaining structure securing the fabric in the open position, a solar panel is positioned adjacent to the housing, and a data and control bus electrically coupling the solar panel with the microcontroller.

14 Claims, 10 Drawing Sheets

AUTOMATED SMART ROOFING SYSTEMS

TECHNICAL FIELD

The present disclosure generally relates to building temperature regulation systems, and in particular, to an automated smart roofing system that utilizes a retractable fabric for conserving energy usage in buildings and homes and thereby reduce greenhouse gas emissions.

BACKGROUND

The present disclosure pertains to the field of building temperature regulation, specifically focusing on roofing systems. Building temperature regulation is a broad field that encompasses various strategies and technologies designed to maintain comfortable indoor temperatures in residential and commercial buildings. This field has a direct impact on the energy consumption of buildings, as heating and cooling systems often account for a substantial portion of a building's energy usage.

Traditional heating and cooling systems typically operate in a binary manner, either adding or removing heat to regulate the indoor temperature. These systems often rely on electricity or gas fuels, contributing to high utility bills and increased greenhouse gas emissions. While effective in maintaining indoor comfort, these systems do not necessarily capitalize on ambient conditions that could be harnessed to improve energy efficiency.

Over the years, research and development efforts in this field have led to the exploration of passive temperature regulation strategies, such as insulation. These strategies aim to reduce the reliance on artificial climate control systems by leveraging the building's design and materials to maintain comfortable indoor temperatures. For instance, insulation can help to prevent heat loss in winter and reduce heat gain in summer, thereby reducing the demand on heating and cooling systems.

Another area of interest in this field is the use of thermochromatic materials. These materials have the potential to prevent heat penetration in summer while allowing heat into the buildings in winters. However, the commercial application of such materials is still in its nascent stages.

SUMMARY

A smart integrated roofing system includes a housing configured to protect components of the roofing system; an extensible tensioned fabric disposed in the housing; a roller configured to regulate the extensible tensioned fabric within the housing in a retracted position and deploy the fabric in an open position; an electric motor disposed in the housing and configured to actuate an operation of the roller. The system includes a light sensor is configured to detect sunlight intensity; a microcontroller configured to control an operation of the electric motor based on the detected sunlight intensity, a wind sensor is configured to detect wind speed, a rain sensor is configured to detect rainfall, a retaining structure securing the fabric in the open position, a solar panel is positioned adjacent to the housing, and a data and control bus electrically coupling the solar panel with the microcontroller.

BRIEF DESCRIPTION OF THE DRAWINGS

Non-limiting and non-exhaustive examples are described with reference to the following figures.

DETAILED DESCRIPTION OF ILLUSTRATIVE EMBODIMENTS

The following description sets forth exemplary aspects of the present disclosure. It is recognized, however, that such description is not intended as a limitation on the scope of the present disclosure. Rather, the description also encompasses combinations and modifications to those exemplary aspects described herein.

The present disclosure pertains to the field of building temperature regulation systems, specifically focusing on roofing systems. Building temperature regulation is a broad field that encompasses various strategies and technologies designed to maintain comfortable indoor temperatures in residential and commercial buildings. This field has a direct impact on the energy consumption of buildings, as heating and cooling systems often account for a substantial portion of a building's energy usage.

Integration of active control with passive strategies is a less explored route. This approach aims to create systems that can adapt to changing weather conditions in real-time, providing a regulated internal environment while minimizing energy consumption. Such systems could revolutionize the way we manage the climatic conditions of buildings, paving the way for a new era of energy-efficient architecture. The present disclosure introduces a novel concept within this field, offering a fresh perspective on how roofing systems can contribute to building temperature regulation.

In some aspects, the present disclosure describes a roofing system that utilizes a retractable fabric for efficient temperature regulation in buildings and homes. Embodiments relate to improving heating/cooling of buildings and homes using active management. Embodiments describe installing a retractable fabric system on the roof that can be triggered, e.g., automatically on a specific schedule. The fabric for the retractable fabric roofing system may be made of meshing material so that it blocks a large fraction of the direct heat reaching the roofline and still retains enough ventilation to maintain effective convective cooling. In addition, a meshing system is mostly transparent and can be made to match the roof color of existing roofs. Because of costs, the retractable fabric roofing system may be installed primarily on the portions of the south side of the building which receives the most summer sun and integrated with solar panels. By integrating the system with a solar panel installation, optimization of installation cost can be achieved.

Figure 1A:
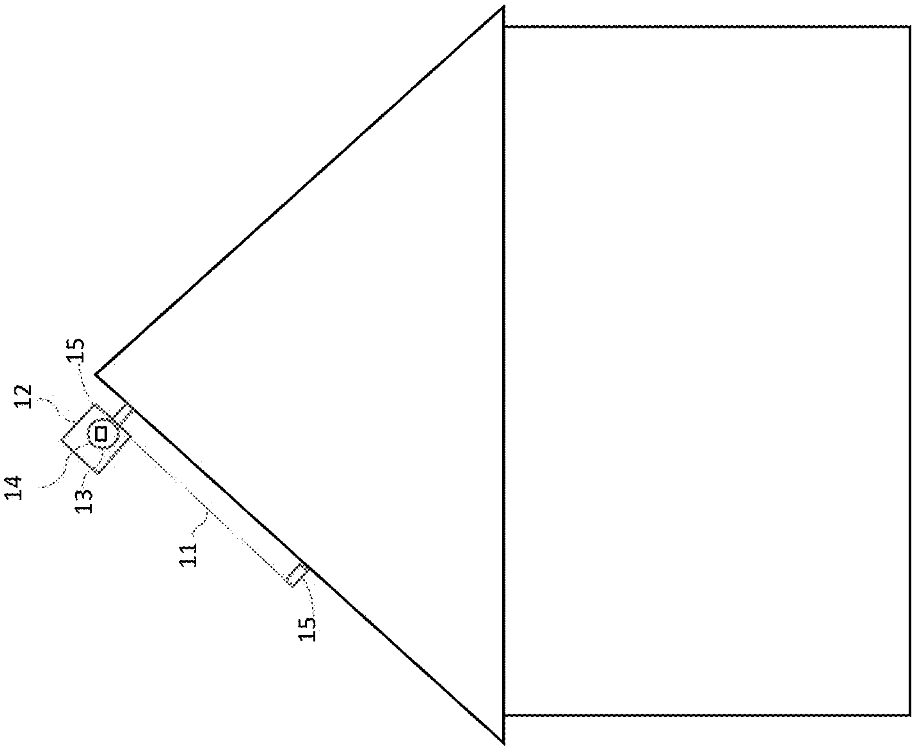
FIG. 1A illustrates an exemplary side view of a retractable fabric roofing system, showcasing its main components and their arrangement, according to aspects of the present disclosure.
Figure 1B:
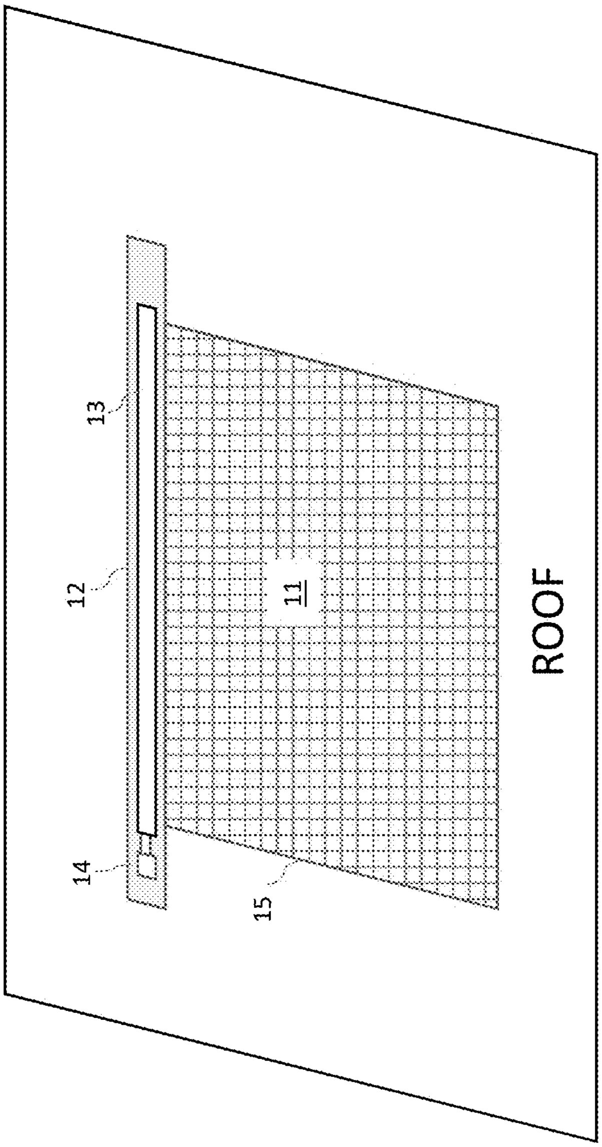
FIG. 1B presents an orthogonal side view of the automated roofing system with the fabric in an extended position, providing a clearer understanding of how the fabric covers the area beneath the roof structure when deployed, according to aspects of the present disclosure.

FIG. 1A illustrates an exemplary side view of a retractable fabric roofing system, while FIG. 1B presents an orthogonal side view of the automated roofing system with the fabric in an extended position, providing a clearer understanding of how the fabric covers the area beneath the roof structure when deployed.

Referring to FIGS. 1A-1B, the system comprises an extensible tensioned (ET) fabric 11, a housing 12, a roller 13, an electric motor 14, and a retaining structure 15. The fabric 11 can be extended or retracted based on the environmental conditions or user preferences, providing a flexible solution for temperature regulation. The housing 12 protects the fabric 11 and the mechanical components of the system, while the roller 13 and the motor 14 facilitate the movement of the fabric 11. The retaining structure 15 provides stability to the housing 12 even when it is extended, ensuring that the fabric 11 remains taut and secure.

Referring to FIG. 1A, the comprehensive assembly of the retractable fabric roofing system is illustrated. The system comprises several components that work in conjunction to offer a flexible roofing solution. The central element of this system is the extensible tensioned (ET) fabric 11, which serves as the retractable roof material. This fabric 11 is designed to extend and retract to provide or retract coverage as desired. In some cases, the fabric 11 may be made of a meshing material that blocks a large fraction of the direct heat reaching the roofline and still retains enough ventilation to maintain effective convective cooling.

The Extensible Tensioned Fabric 11, as utilized in the disclosed retractable fabric roofing system, is a specialized material chosen for its robustness, resilience, and capability to endure environmental stressors. While the patent document does not delineate the precise material composition, fabrics of this nature are typically fabricated from materials exhibiting high strength and weather resistance, capable of withstanding prolonged exposure to environmental elements without degradation in quality or performance.

Commonly employed materials for such applications may encompass PVC, PTFE, ETFE, and HDPE fabrics as described in more detail below. Polyvinyl Chloride (PVC) Coated Polyester is recognized for its strength, durability, and resistance to ultraviolet radiation, water, and mildew. The PVC coating imparts an additional protective layer that augments the fabric's longevity and facilitates ease of cleaning. PTFE (Polytetrafluoroethylene) Coated Fiberglass is often identified by the brand name Teflon, is employed to coat fiberglass, thereby creating a fabric that is not merely strong and tear-resistant but also self-cleaning due to its non-stick properties. It also exhibits resistance to ultraviolet rays, chemical exposure, and extreme temperatures. ETFE (Ethylene Tetrafluoroethylene) is a polymer that is lightweight, transparent, and exhibits high resistance to corrosion. It is frequently used in applications where light transmission is desired in conjunction with durability. HDPE (High-Density Polyethylene) fabrics are recognized for their tensile strength, ultraviolet resistance, and capability to withstand environmental stressors such as wind and rain.

The extensible tensioned fabric (11) used in the retractable fabric roofing system is designed with a specific porosity range to optimize its performance in various environmental conditions. The porosity of the fabric, which refers to the percentage of open space within the material, is a pivotal aspect of the design that directly influences the system's ability to resist wind, promote convective cooling, and reduce direct absorption of heat.

The fabric (11) is engineered with a porosity range of approximately 10% to 60%. This range allows for a balance between the fabric's protective qualities and its ability to facilitate air circulation. For instance, a fabric with a porosity of 10% to 20% would offer substantial protection from direct sunlight, while still allowing for effective convective cooling. The open spaces within the fabric enable air to pass through, promoting the circulation of cooler air and helping to regulate the temperature beneath the covered area.

By adjusting the porosity within this range, the fabric can be tailored to meet specific requirements related to the environmental conditions of the installation site. For example, in a hot and windy climate, a fabric with a higher porosity might be selected to maximize convective cooling. Conversely, in a cooler or rainy environment, a fabric with a lower porosity might be preferred to provide greater protection from the elements.

It is worth noting that while the fabric's porosity contributes to convective cooling, it also helps to reduce direct absorption of heat. The open spaces within the fabric allow only a portion of the incident sunlight to pass through, reducing the amount of heat that is absorbed by the fabric and subsequently transferred to the space below. For example, at 10% porosity, only 10% of the direct sunlight reaches the roof. This feature, combined with the fabric's reflective properties, helps to maintain a comfortable temperature beneath the roofing system, even in hot weather conditions.

The fabric 11 is housed within a protective casing known as the housing 12. This housing 12 safeguards the fabric 11 when it is retracted and contains the mechanical components that facilitate the movement of the fabric 11. Within the housing 12, there is a roller 13 around which the fabric 11 rolls and unrolls. The roller 13 is integral to the system as it allows for the smooth extension and retraction of the fabric 11.

An electric motor 14 is connected to the roller 13 and is responsible for the automated movement of the fabric 11. The motor 14 receives signals from a control system (not shown in this figure) that dictates when and how the fabric 11 is to be moved based on various inputs, such as weather conditions or user preferences.

At the distal edge of the fabric 11, away from the housing 12, there is a second portion of retaining structure 15. This second portion of retaining structure 15 serves to anchor the fabric 11 when it is extended, providing tension that keeps the fabric 11 taut and in place. The retaining structure 15 is an integral part of the system's design, ensuring that the fabric 11 remains stable and secure during use.

In some aspects, the retractable fabric roofing system may be installed primarily on the portions of the south side of the building which receive the most summer sun. This configuration allows the system to capitalize on the maximum amount of sunlight for efficient temperature regulation.

The installation of the retractable fabric roofing system primarily on the south side of the building, which receives the maximum summer sun, is a strategic decision that contributes to cost minimization in several ways. By focusing the installation on the area of the building that receives the greatest amount of sunlight, the system can maximize its efficiency in temperature regulation. This can reduce the reliance on traditional heating and cooling systems, leading to substantial energy savings and lower utility bills for the building occupants. By limiting the installation to a specific portion of the building, the amount of material used for the roofing system is reduced. This can lower the initial investment cost for the system, making it a more affordable solution for temperature regulation.

The use of a retractable fabric system allows for the potential reduction in maintenance and replacement costs. The fabric can be retracted when not in use, protecting it from weather-related wear and tear and extending its lifespan compared to traditional roofing materials.

From an aesthetic perspective, installing the retractable fabric roofing system primarily on the south side of the building also offers several advantages. The system's design is flexible and adaptable, allowing it to blend seamlessly with the existing architecture of the building. The fabric used for the roofing system can be chosen to match the color and style of the existing roof, ensuring that the system does not detract from the overall aesthetic appeal of the building. By focusing the installation on one side of the building, the visual impact of the system is minimized. This can be particularly beneficial in areas where architectural harmony or historical preservation is a priority. The use of a retractable system allows for the building's appearance to be altered according to the weather conditions or the preferences of the occupants. This dynamic aesthetic element can add a modern and innovative touch to the building's design.

Referring to FIG. 1B, the operation of the retractable fabric roofing system is illustrated. The fabric 11 is shown in an extended position, providing coverage beneath the roof structure. In the retractable fabric roofing system, the housing 12, which is mounted above the fabric 11, not just encloses the roller 13 and the motor 14, but also houses other sensitive components. These components include the microcontroller 31 and the power supply 50 32 (described below in FIG. 5), both of which are integral to the operation of the system. The housing 12 is designed to protect these components from environmental factors, such as moisture and debris, thereby ensuring the longevity and reliability of the system's operation.

The housing 12 thus serves a dual purpose. Firstly, it provides a structural base for the fabric 11 to roll onto when retracted. Secondly, it acts as a protective enclosure for the system's sensitive components. The motor 14, which drives the roller 13, and the power supply 50 32, which provides the electrical energy for the system, are both housed within the housing 12. This arrangement safeguards these components from potential damage caused by weather conditions, thereby enhancing the durability and operational efficiency of the roofing system.

The housing 12 is designed to be weather-sealed, providing an additional layer of protection for the enclosed components. This weather-sealing feature prevents the ingress of moisture, dust, and other environmental elements that could potentially harm the motor 14, the power supply 50 32, and the microcontroller 31. By housing these components within a weather-sealed enclosure, the roofing system ensures reliable and uninterrupted operation, even in adverse weather conditions.

The motor 14 is connected to the roller 13 and is the driving force behind the fabric's movement. When activated, the motor 14 enables the fabric 11 to unroll from the roller 13, extending outwards to provide coverage. Conversely, when the fabric 11 is to be retracted, the motor 14 rolls the fabric 11 back onto the roller 13, tucking it away within the housing 12. This automated movement of the fabric 11, facilitated by the motor 14 and the roller 13, allows for real-time adaptation to changing weather conditions and user preferences.

The motor 14 is an electric type, powered by a power supply 50 (e.g., power supply 50 of FIG. 5) that can be connected to the building's main electrical system, a solar power source, or a combination of both. The power supply 50 provides the electrical energy that the motor 14 requires to operate. The motor's power and torque are calibrated to handle the size and weight of the fabric 11, ensuring efficient and consistent operation. The motor 14 is designed to operate quietly to minimize noise disturbance during the extension and retraction of the fabric 11.

The motor 14 is controlled by a microcontroller 31 that can be programmed to respond to various inputs. These inputs can include timers, remote controls, or sensor data from a weather sensor 40. The microcontroller 31 processes these inputs and sends control signals to the motor 14 to dictate the movement of the fabric 11. For instance, if the weather sensor unit 40 detects high wind speeds or rainfall, the microcontroller 31 can send a signal to the motor 14 to retract the fabric 11. Conversely, if the weather sensor 40 detects favorable weather conditions, the microcontroller 31 can signal the motor 14 to extend the fabric 11.

The motor 14 can also be programmed to operate on a schedule, automatically extending or retracting the fabric 11 at predetermined times. This feature can be particularly useful for optimizing the system's performance based on the typical weather patterns of the installation site. For example, the motor 14 can be programmed to extend the fabric 11 in the morning to provide shade during the hottest part of the day, and retract the fabric 11 in the evening to allow for natural cooling.

The electric motor 14 is a central component of the retractable fabric roofing system, providing the mechanical power that enables the system's automated operation. Its design and operation are carefully calibrated to ensure efficient, reliable, and quiet operation of the system, contributing to the system's overall performance and user satisfaction.

The retaining structure 15 is shown attached to the edge of the fabric 11, highlighting its role in maintaining the fabric's position and tension when extended. This ensures that the fabric 11 remains stretched out and resistant to environmental factors such as wind, which might otherwise cause flapping or sagging. The retaining structure 15 may be a fixed or movable component, depending on the design of the system, and it may include additional features such as locking mechanisms or tension adjustment capabilities.

Together, FIGS. 1A and 1B provide a comprehensive view of the retractable fabric roofing system, showcasing its main components and the functionality of the system when the fabric 11 is both retracted and extended. This system offers a flexible and energy-efficient solution for temperature regulation in buildings and homes, combining the benefits of passive temperature regulation strategies with the adaptability of active control.

Figure 2:
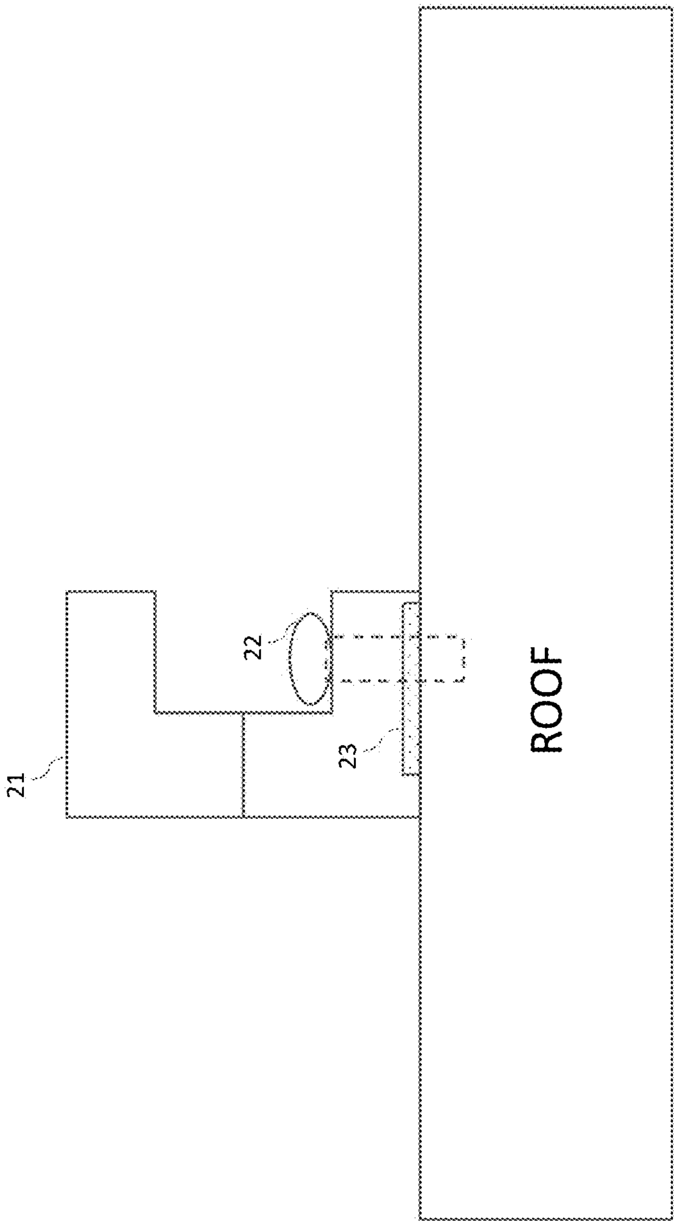
FIG. 2 depicts an orthogonal side view of a modular component system for a roofing structure, highlighting the brackets, fasteners, and sealants, which are pivotal for the assembly and stability of the retractable fabric roofing system, according to aspects of the present disclosure.

Referring to FIG. 2, the modular component system for a roofing structure is depicted. This system comprises brackets 21, fasteners 22, and sealants 23. These components play a pivotal role in the assembly and stability of the retractable fabric roofing system.

The brackets 21 function as the foundational points of attachment for the roofing system to the preferred surface. In some cases, the preferred surface may be the southern side of a roof, which typically receives the maximum sun exposure. The housing 12, which protects the fabric 11 and the mechanical components of the system, may be attached to these brackets 21.

The fasteners 22 are utilized to secure the brackets 21 to the roof. In some aspects, these fasteners 22 may be designed to not damage the roof, ensuring the integrity of the roof structure while providing a secure attachment point for the roofing system. The fasteners 22 may be made of various materials, such as metal or plastic, and may come in different forms, such as screws, nails, or adhesive strips, depending on the specific requirements of the installation.

Sealants 23 are applied at the points where the roofing system attaches to the structure. These sealants 23 serve to prevent water and moisture penetration, ensuring that the mechanical components within the system, such as the roller 13 and the motor 14, are protected from weather-related damage. The sealants 23 may be made of various materials, such as silicone, acrylic, or polyurethane, and may be applied in different forms, such as liquid, paste, or tape, depending on the specific requirements of the installation.

The retractable fabric roofing system, as described in the present disclosure, is designed to withstand heavy winds, a feature that is integral to its performance and durability. This wind resistance is achieved through the strategic design and arrangement of the system's components, particularly the fasteners and the housing.

The fasteners 22, as depicted in FIG. 2, play a pivotal role in securing the roofing system to the structure, such as a building's roof. These fasteners 22 are designed to provide a strong and stable connection between the brackets 21 and the roof, ensuring that the system remains anchored even in high wind conditions. The design and material of the fasteners 22 are selected to withstand the forces exerted by heavy winds, preventing the system from being dislodged or damaged.

The housing 12, as illustrated in FIGS. 1A and 1B, serves as a protective enclosure for the fabric 11 and the mechanical components of the system, such as the roller 13 and the motor 14. The housing 12 is securely attached to the structure using the fasteners 22, providing a robust base that resists wind forces. When the fabric 11 is retracted, it is stored within the housing 12, shielding it from direct exposure to wind and reducing the wind load on the system. This design feature enhances the system's wind resistance, ensuring its stability and longevity in windy conditions.

The retractable fabric roofing system is engineered to withstand heavy winds, thanks to the strategic design and arrangement of its components. The fasteners 22 provide a secure attachment to the structure, while the housing 12 offers protection and stability. These features, combined with the system's automated control that can retract the fabric 11 in high wind conditions, ensure that the system remains secure and functional even in adverse weather conditions.

Together, the brackets 21, fasteners 22, and sealants 23 provide a secure and weather-resistant foundation for the retractable fabric roofing system. This modular component system allows for easy assembly and installation of the roofing system, while ensuring its stability and durability under various environmental conditions.

Figure 3:
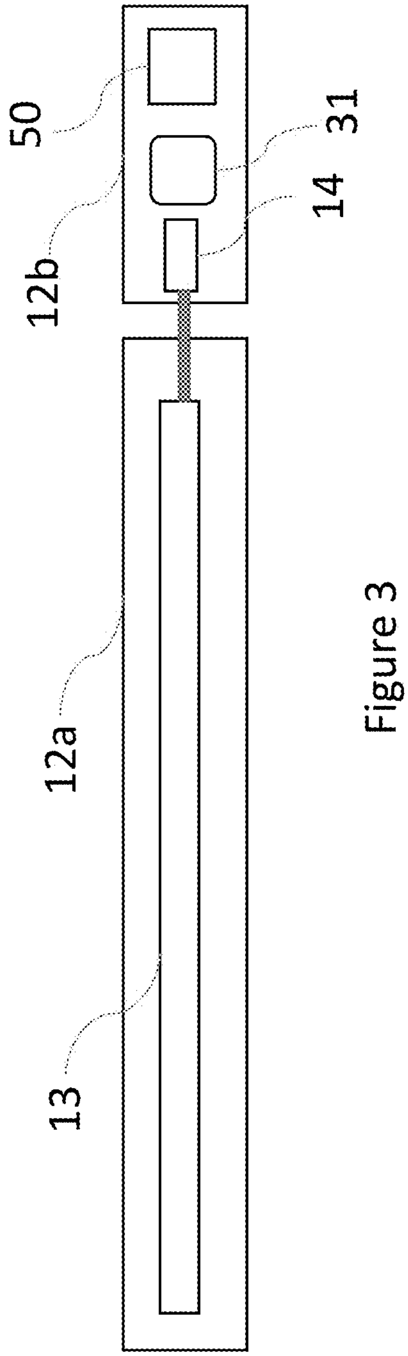
FIG. 3 provides an orthogonal view of the internal component layout of the automated roofing system, offering a detailed view of the arrangement and interrelationship between the roller, motor, first component housing, second component housing, power supply 50, and microcontroller, according to aspects of the present disclosure.

Referring to FIG. 3, the internal component layout of the automated roofing system is depicted. The roller 13 is connected to the first component housing **12*a* and the second component housing 12*b*, which may be aligned in a linear configuration. The first component housing 12*a* is designed to encase the roller 13, providing a protective enclosure for the roller 13 and facilitating the smooth extension and retraction of the fabric 11**.

The second component housing **12*b* contains the power supply 50, the motor 14, and the microcontroller 31. The motor 14 is responsible for the movement of the roller 13, enabling the extension and retraction of the fabric 11. The motor 14 receives commands from the microcontroller 31, which is powered by the power supply 50 1. This arrangement facilitates the automated extension and retraction of the fabric 11** based on sensor inputs, ensuring efficient operation and maintenance of the roofing system.

In some aspects, the power supply 50 for the electric motor 14 can be configured in several ways to ensure consistent operation and to meet the energy preferences or requirements of the installation site. For instance, the power supply 50 32 can be connected to the house's electrical system, providing a steady supply of electricity for the operation of the motor 14. This configuration ensures that the motor 14 can operate without interruption, allowing for the continuous extension and retraction of the fabric 11.

In other cases, the power supply 50 32 can be configured to utilize solar power. This configuration is particularly advantageous for installations in sunny climates or in situations where reducing the carbon footprint is a priority. Solar power can either be the primary source of energy or serve as a backup to the main electrical system, providing a sustainable and eco-friendly power solution for the motor 14.

In yet other cases, a combination of house power and solar power can be used to power the motor 14. During sunny periods, the motor 14 can run on solar-generated electricity, while at night or during periods of insufficient sunlight, it can switch to the house's electrical supply. This hybrid power supply 50 configuration allows for energy savings and provides a backup power source to ensure continuous operation of the motor 14 and the roller 13.

Regardless of the primary power source, a battery backup system can be included to provide power to the motor 14 in the event of a power outage. This ensures that the roofing system can still be retracted or extended during emergencies or when the main power supply 50 is unavailable, enhancing the reliability and resilience of the roofing system.

Figure 4A:
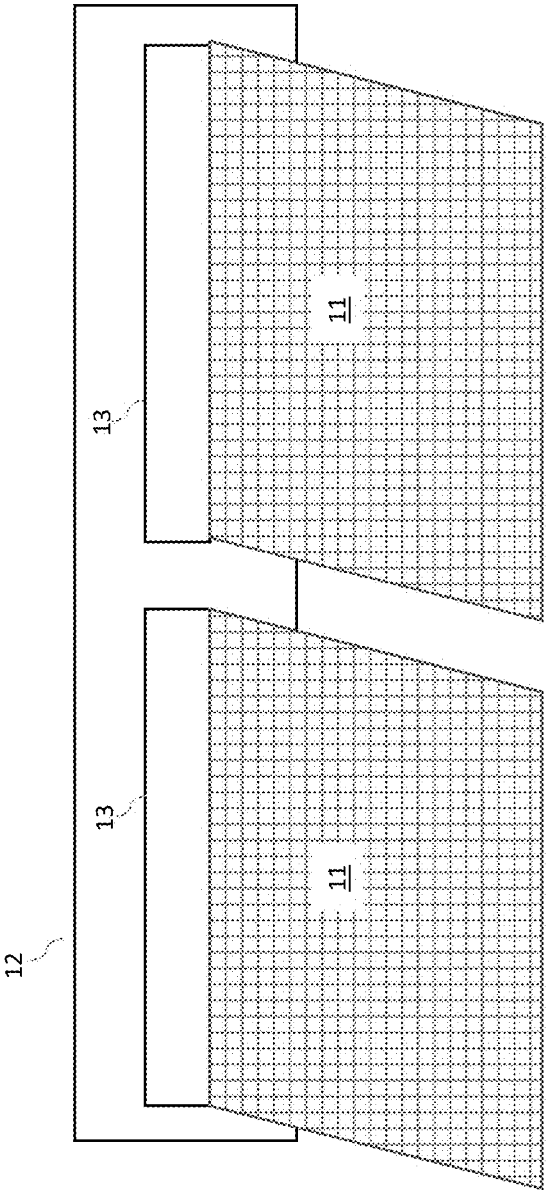
FIG. 4A illustrates an orthogonal view of a roofing system featuring a dual roller mechanism, demonstrating the fabric's capability to be independently extended or retracted from the roller within the housing, allowing for customizable shading or ventilation, according to aspects of the present disclosure.

Referring to FIG. 4A, an orthogonal view of a roofing system featuring a dual roller mechanism is depicted. The housing 12, which serves as a protective enclosure for the system's components, contains the roller 13. The roller 13 supports the extensible tensioned (ET) fabric 11, which is the primary roofing material of the system. The fabric 11 is shown in two different positions, indicating its ability to be independently extended or retracted from the roller 13 within the housing 12.

In some cases, the fabric 11 may be extended to provide shade and reduce solar heat gain, thereby contributing to the cooling of the area beneath the roofing system. In other cases, the fabric 11 may be retracted to allow sunlight to reach the area beneath the roofing system, potentially contributing to natural warming during cooler periods. This ability to independently extend or retract the fabric 11 provides a flexible solution for temperature regulation, allowing for customizable shading or ventilation based on the current weather conditions or user preferences.

The dual roller mechanism, as depicted in FIG. 4A, enhances the flexibility and adaptability of the roofing system. By allowing the fabric 11 to be independently extended or retracted, the system can provide varying levels of coverage, from full coverage when the fabric 11 is fully extended, to partial or no coverage when the fabric 11 is partially or fully retracted. This feature allows the system to adapt to changing weather conditions in real-time, providing a regulated internal environment while minimizing energy consumption.

Figure 4B:
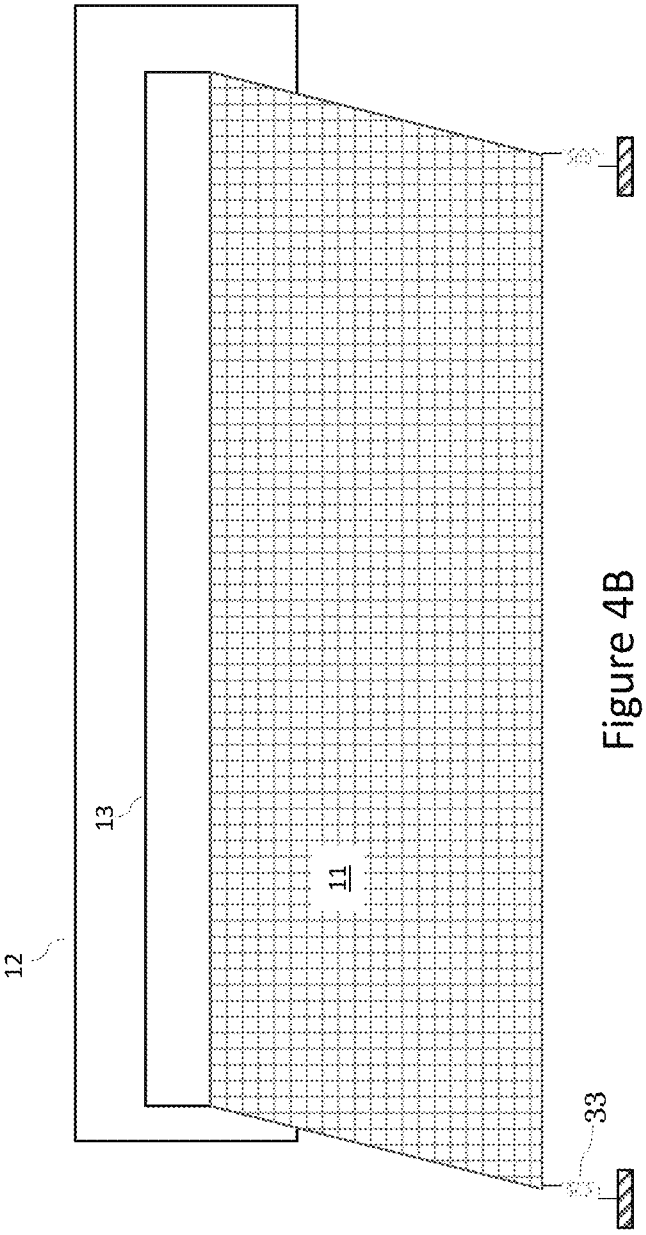
FIG. 4B depicts a side view of a tensioned roller system for an extendable fabric, showcasing a built-in coil that maintains a constant tension in the extensible tensioned fabric during its extension or retraction, according to aspects of the present disclosure.

Referring to FIG. 4B, an orthogonal side view of a tensioned roller system for an extendable fabric is depicted. The housing 12, which serves as a protective enclosure for the system's components, contains the roller 13. The roller 13 is the cylindrical component around which the fabric 11 rolls and unrolls. A spring mechanism 33 is connected to the roller 13, playing a pivotal role in maintaining constant tension in the extensible tensioned fabric 11 during its extension or retraction.

In some cases, the spring mechanism 33 may be a coil spring, a torsion spring, or any other type of spring suitable for maintaining tension in the fabric 11. The spring mechanism 33 is designed to exert a force that opposes the movement of the fabric 11, thereby maintaining a constant tension in the fabric 11. This constant tension ensures that the fabric 11 remains taut when extended, enhancing its resistance to environmental factors such as wind and preventing sagging to maintain the aesthetic and functional integrity of the system.

Figure 5:
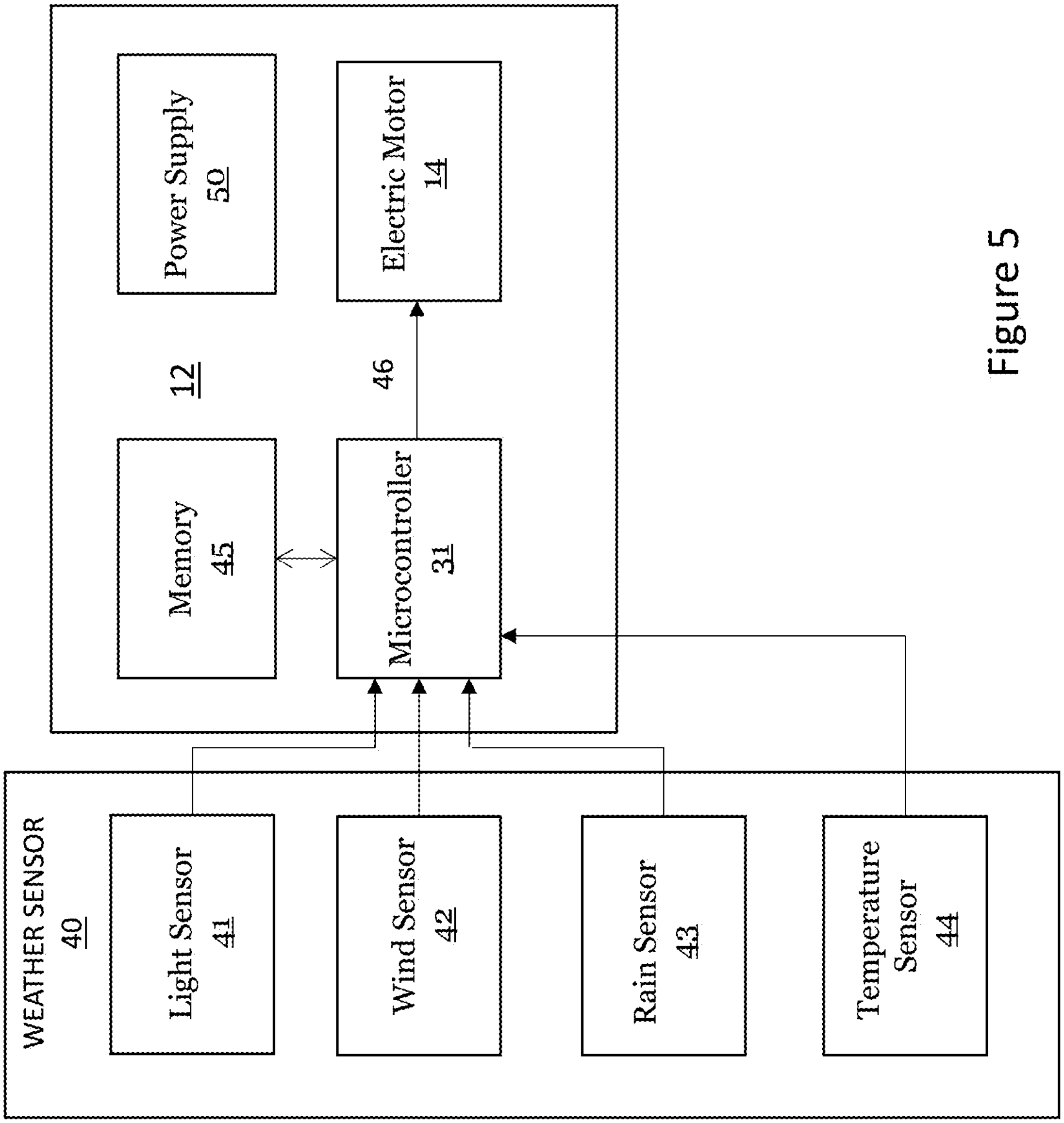
FIG. 5 presents a block diagram of an automated weather-responsive system, highlighting the central weather sensor unit connected to a primary microcontroller, which is housed within the system housing, according to aspects of the present disclosure.

FIG. 5 presents a block diagram of an automated weather-responsive system of the retractable fabric roofing system in accordance with an embodiment. This system is designed to adapt to real-time weather changes, providing a regulated internal environment while optimizing energy usage.

The heart of this system is the central weather sensor unit 40, which is connected to a primary microcontroller 31 housed within the system housing 12. The weather sensor unit 40 is composed of several individual sensors, including a light sensor 41, a wind sensor 42, a rain sensor 43, and a temperature sensor 44. These sensors are engineered to monitor the surrounding environmental conditions and relay real-time data to the primary microcontroller 31.

The light sensor 41 is responsible for detecting the level of ambient light in the environment. This data can be utilized to automate the movement of the fabric 11 based on the time of day or the presence of sunlight. For example, during daylight hours, the fabric 11 can be extended to provide shade and reduce solar heat gain. Conversely, as the ambient light decreases in the evening or at night, the fabric 11 can be retracted. For example, during daytime the light levels may be in the range of 10,000 to 50,000 Lux which reduces around dawn and dusk. A cloudy day may have a light level around 1000 Lux. The light during dusk and dawn by drop well below 500 Lux. Advantageously, embodiments may be designed to not deploy or retract the fabric when there is no direct sunlight, e.g., when it is cloudy or during dawn and dusk. Hence, the light sensor may be set to detect light levels around 1000 to 2000 Lux at which point the microcontroller 31 may decide to retract the roller 13.

The wind sensor 42 measures the wind speed in the vicinity of the roofing system. If the wind sensor 42 detects wind speeds exceeding a predetermined threshold, the microcontroller 31 may decide to retract the fabric 11 to prevent potential wind damage.

The operation of the wind sensor 42 with the specified wind speed thresholds may be described as follows. The wind sensor 42 continuously measures the wind speed around the roofing system. If the wind sensor 42 detects wind speeds exceeding 10 miles per hour, which may be considered a threshold for caution, it sends this data to the primary microcontroller, identified by the element label 31. Upon receiving the wind speed data, the microcontroller 31, which operates based on pre-programmed instructions stored in the memory storage 45, evaluates the potential risk. When wind speeds reach or surpass 15 to 20 miles per hour, recognized as a high wind speed threshold, the microcontroller 31 may determine that the conditions are unsafe for the extended fabric 11, and command the system to retract the fabric. The microcontroller 31 may then send a retraction signal through the control signal pathway 46, to the motor 14, which activates the roller 13, to roll the fabric 11, into the housing 12. The wind sensor may also be able to pick up wind gusts, which may be strong wind over a short period of time such as 1-2 seconds. Upon detecting three or more wind gusts within a short time (e.g., 1 minute), the microcontroller 31 may decide to retract the roller 13 so as to prevent damage to the roofing system. The system can be configured to maintain the fabric 11, in the retracted position until the wind sensor 42, indicates that wind speeds have decreased below the cautionary threshold, ensuring the system's safety and integrity.

This tailored response to varying wind conditions allows the roofing system to adapt to changing weather, protecting the structure from potential wind damage while also optimizing the use of the fabric for shading and energy conservation.

The rain sensor 43 is designed to detect the presence of moisture indicative of rainfall. Upon detecting moisture, the rain sensor 43 sends a signal to the microcontroller 31, which then issues a command to retract the fabric 11 to prevent water from accumulating on or passing through the fabric, thereby protecting the space below.

The temperature sensor 44 monitors the ambient temperature around the retractable fabric roofing system. It ensures that the system operates within a safe temperature range, which, as specified, is from 40° F. to 120° F. If the temperature falls below 40° F. or rises above 120° F., the sensor sends this data to the microcontroller 31, which may prevent the extension of the fabric 11 or initiate its retraction to protect the system's components and the fabric material from extreme temperatures.

The memory storage 45 is also connected to the primary microcontroller 31, storing instructions that the microcontroller 31 executes. These instructions dictate how the microcontroller 31 responds to the data received from the weather sensors 40, ensuring that the fabric 11 is extended or retracted in response to the current environmental conditions.

A control signal pathway 46 links the primary microcontroller 31 to the motor 14, allowing the microcontroller 31 to control the extension and retraction of the motor 14 in response to the data received from the weather sensors 40. This ensures that the movement of the fabric 11 is automated and responsive to the real-time weather conditions, providing a flexible and adaptive solution for temperature regulation in buildings and homes.

In another aspect of the present disclosure, the retractable fabric roofing system can be programmed to follow a yearly calendar schedule for the retraction and extension of the fabric 11. This feature allows the system to adapt to seasonal changes and varying weather conditions, providing a more efficient and automated solution for temperature regulation in buildings and homes.

During the winter months, when the sun is lower in the sky and the days are shorter, the system can be programmed to keep the fabric 11 retracted all the time. This allows the maximum amount of sunlight to reach the roof, potentially contributing to natural warming of the building and reducing the demand on heating systems. The specific period for winter can be defined in the system's calendar schedule, which can be programmed into the microcontroller 31 or obtained from an external clock source via WiFi.

In milder seasons such as fall and spring, the time for retraction and extension of the fabric 11 can be controlled based on the specific weather conditions and user preferences. For instance, the fabric 11 can be extended during the hottest part of the day to provide shade and reduce solar heat gain, and retracted during cooler periods to allow natural warming from the sun. The system can be programmed to follow a daily schedule for these seasons, with the specific times for retraction and extension set based on historical weather data or user inputs.

The microcontroller 31, which is connected to the motor 14 via the control signal pathway 46, is responsible for controlling the movement of the fabric 11 based on the calendar schedule. The microcontroller 31 receives the current date and time from the system clock or an external source, and compares this information with the programmed schedule. If the current time matches a scheduled time for retraction or extension, the microcontroller 31 sends a control signal to the motor 14, causing the roller 13 to roll the fabric 11 into or out of the housing 12.

This yearly calendar controlled retraction and extension feature enhances the adaptability and energy efficiency of the retractable fabric roofing system. By automating the movement of the fabric 11 based on a yearly calendar schedule, the system can provide a regulated internal environment that adapts to seasonal changes and varying weather conditions, while minimizing energy consumption.

In conclusion, FIG. 5 demonstrates the intelligent control mechanism of the retractable fabric roofing system. The system's ability to adapt to changing weather conditions in real-time is made possible by the integration of various sensors, a microcontroller, and an automated motor, providing a regulated internal environment while minimizing energy consumption.

Figure 6:
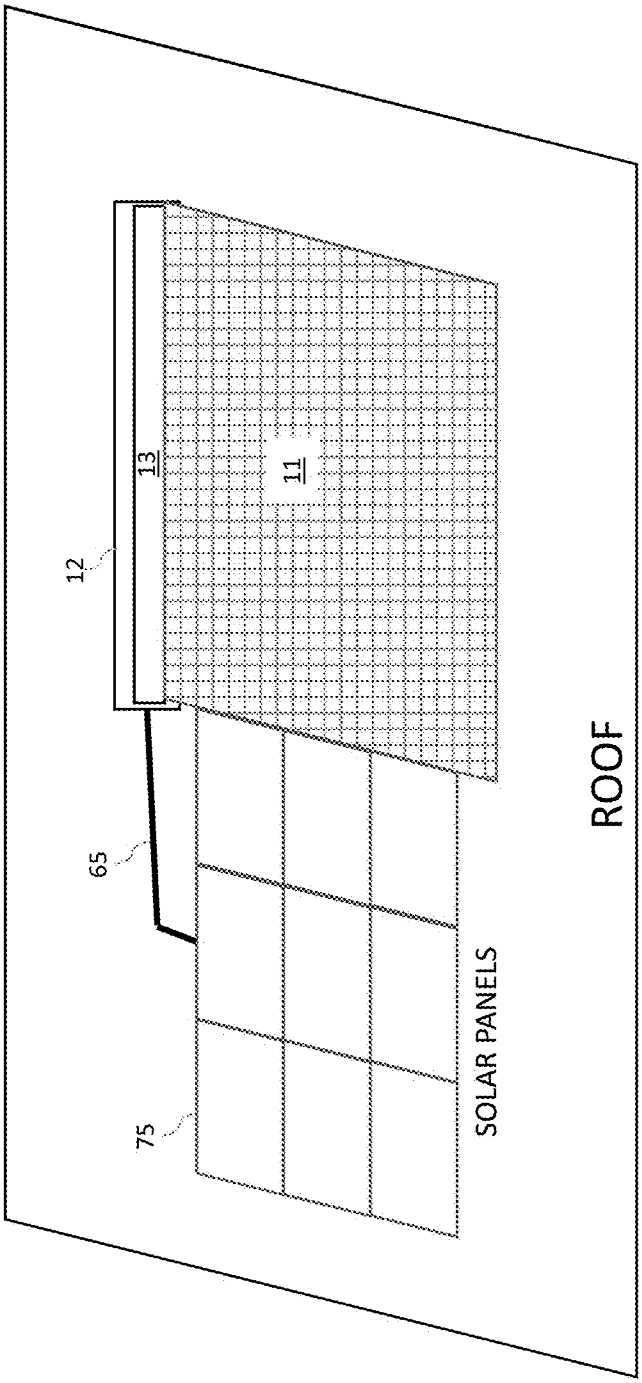
FIG. 6 is illustrates an orthogonal view of a roofing system featuring an integrated system comprising a solar panel and a retractable roofing system, according to aspects of the present disclosure.

FIG. 6 provides an orthogonal top view of a roofing system that incorporates solar panels. FIG. 6 provides a top view of the retractable fabric roofing system, showcasing its integration with solar panels. This figure highlights the system's ability to provide shade and reduce solar heat gain while also harnessing solar energy for power generation, demonstrating its potential for energy-efficient temperature regulation in buildings and homes.

The roofing system includes an Extensible Tensioned fabric 11, a housing 12, a roller 13, and a solar panel section 75. The Extensible Tensioned fabric 11 is depicted in a deployed state beneath the housing 12, which accommodates the roller 13. The solar panel section 75 is situated adjacent to the housing 12 on the roof, designed to harness solar energy.

The Extensible Tensioned fabric 11 functions as the primary roofing material. It is engineered to extend and retract in response to environmental conditions or user preferences. When extended, the Extensible Tensioned fabric 11 provides shade and mitigates solar heat gain, thereby contributing to the cooling of the area beneath the roofing system. When retracted, the Extensible Tensioned fabric 11 is housed within the housing 12, protecting it from environmental elements and prolonging its lifespan.

The housing 12 serves a protective role, enclosing the system's components, including the roller 13 around which the Extensible Tensioned fabric 11 rolls and unrolls. The housing 12 is designed to withstand various environmental conditions, ensuring the longevity and reliability of the system's operation.

Adjacent to the housing 12 is the solar panel section 75. The solar panel section 75 is positioned on the roof to capture solar energy, converting it into electrical power. This power can be used to operate the electric motor 14 that drives the roller 13, or it can be fed into the building's electrical system for use by other appliances. The solar panel section 75 may include a plurality of solar panels. The integration of solar panels into the roofing system enhances its energy efficiency, reducing reliance on traditional power sources and contributing to environmental sustainability.

A data and control bus 65 may couple the solar panel section 75 and allow the transfer of data and control signals between the microcontroller 31 of the retractable roofing system and the solar panel section 75. For example, the microcontroller 31 may determine when to power the retractable roofing system directly from the solar panel section 75. In addition, the microcontroller 31 may provide based on the weather sensor data control signals to a main controller of the solar panel section 75. For example, for safety reasons, under some circumstances, the main controller of the solar panel section 75 may disconnect the power producing active circuitry of the solar panel section 75 from rest of the electronic components. Examples of such conditions include rain, excessive wind (e.g., above 50 miles per hour), or excessive temperature (e.g., above 120 F).

Advantageously, in various embodiments, the same installer and installation brackets that are used for solar panel installation may be repurposed for installing the retractable fabric system lowering installation costs. This also allows the consumer to choose a lesser expensive product on parts of the roof while still achieving lower energy usage.

Experiments were conducted on a prototype model. The data showed that adding a porous mesh fabric can reduce the energy used to cool by at least 10% and changing the color of the roof can reduce the energy used to cool by at least 20%. Hence, a light colored porous fabric retractable roofing solution can provide significant savings. Unlike permanent roofing material that are restricted by building code and home owners associations, a light colored porous fabric mounted at critical locations on the roof may be more acceptable.

Figure 7:
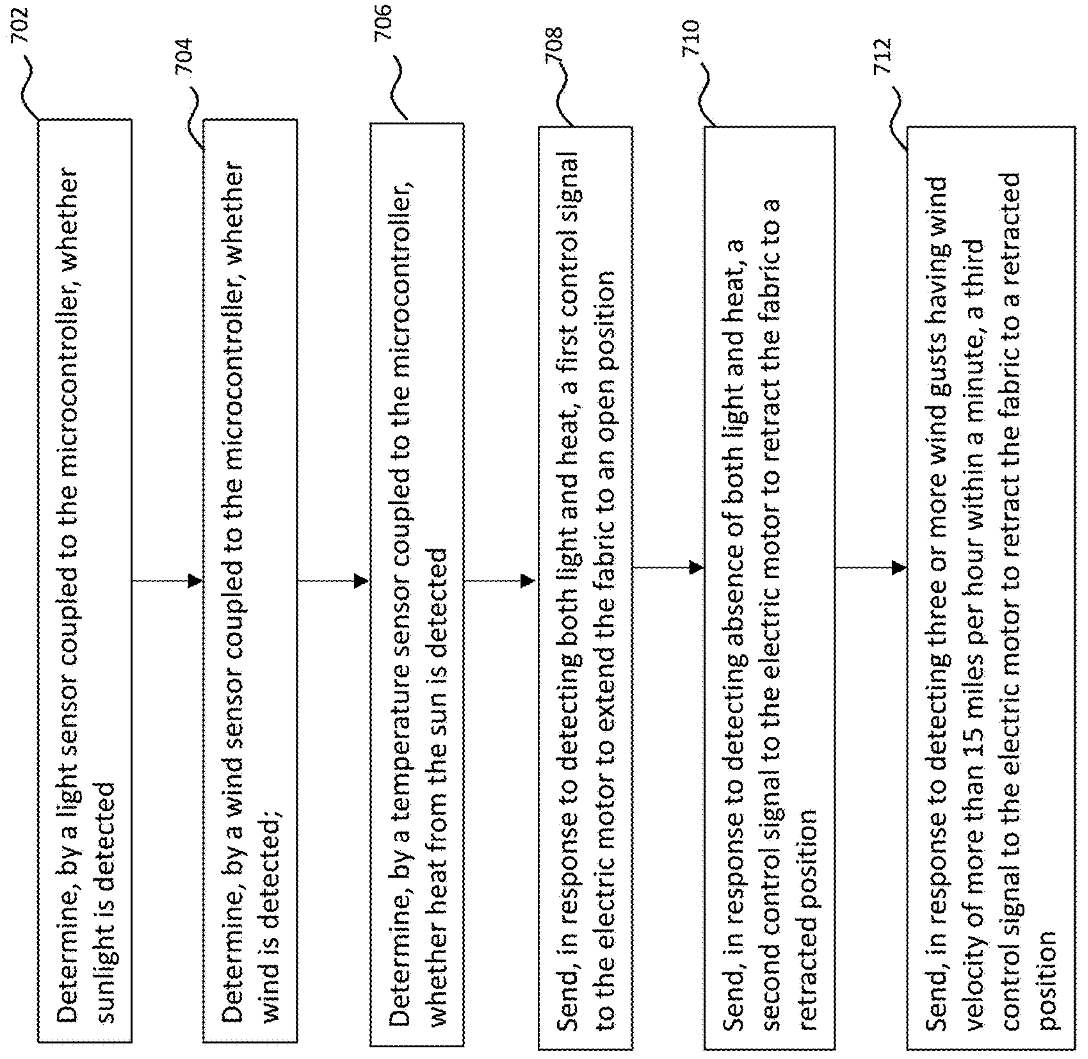
FIG. 7 illustrates a flow chart of a method of implementing a retractable roofing system, according to aspects of the present disclosure.

FIG. 7 illustrates a flow chart of a method of implementing a retractable roofing system, according to aspects of the present disclosure.

An embodiment describes a method of operating a roofing system that is attached to the south side of a roof. The roofing system comprises an extensible tensioned fabric, a housing, a roller, an electric motor, a microcontroller, a light sensor, a retaining structure, and a solar panel. The method includes determining, by a light sensor coupled to the microcontroller, whether sunlight is detected (702), determining, by a wind sensor coupled to the microcontroller, whether wind is detected (704), determining, by a temperature sensor coupled to the microcontroller, whether heat from the sun is detected (706), sending, from the microcontroller, in response to detecting both light and heat, a first control signal to the electric motor to extend the fabric to an open position (708) and in response to receiving the first control signal, the electric motor actuates a roller to position an extensible tensioned fabric to an open position.

The method includes sending, from the microcontroller, in response to detecting absence of both light and heat, a second control signal to the electric motor to retract the fabric to a retracted position (710), sending, from the microcontroller, in response to detecting three or more wind gusts having wind velocity of more than 15 miles per hour within a minute, the second control signal to the electric motor to retract the fabric to a retracted position (712). The second control signal has a higher priority than the first control signal. Therefore, even if both light and heat are detected but three or more wind gusts having wind velocity of more than 15 miles per hour within a minute are also detected, the second control signal signals to the electric motor (even if first control signal is received) to retract the extensible tensioned fabric to the retracted position.

In one aspect, the light sensor may be configured to detect sunlight intensity and wherein the first control signal is generated and transmitted to the electric motor to extend the fabric to the open position when the light sensor detects more than 2000 Lux. The second control signal may be generated and transmitted to the electric motor to retract the fabric to the retracted position when the light sensor detects light less than 2000 Lux.

In one aspect, the method includes receiving, by the microcontroller, a user input signal indicating a user preference for the position of the fabric, the microcontroller is further configured to override the first and second control signals based on the user input signal.

In one aspect, the microcontroller is further configured to send a fourth control signal to the electric motor to extend the fabric to the open position at predetermined times of the day, the fourth control signal has a higher priority than the first control signal. In one aspect, the light sensor is configured to detect sunlight intensity and wherein the first control signal is generated and transmitted to the electric motor to extend the fabric to the open position when the light sensor detects more than a predetermined intensity level, and wherein the second control signal is generated and transmitted to the electric motor to retract the fabric to the retracted position when the light sensor detects light less than the predetermined intensity level, wherein the predetermined intensity level is adjustable based on user preferences or seasonal changes. In one aspect, the user input signal is received via a remote control device or a smartphone application.

In one aspect, the temperature sensor is configured to detect ambient temperature, wherein the first control signal is generated and transmitted to the electric motor to extend the fabric to the open position when the temperature sensor detects more than a predetermined temperature, and wherein the second control signal is generated and transmitted to the electric motor to retract the fabric to the retracted position when the temperature sensor detects light less than the predetermined temperature, wherein the predetermined temperature is adjustable based on user preferences or seasonal changes.

Figure 8:
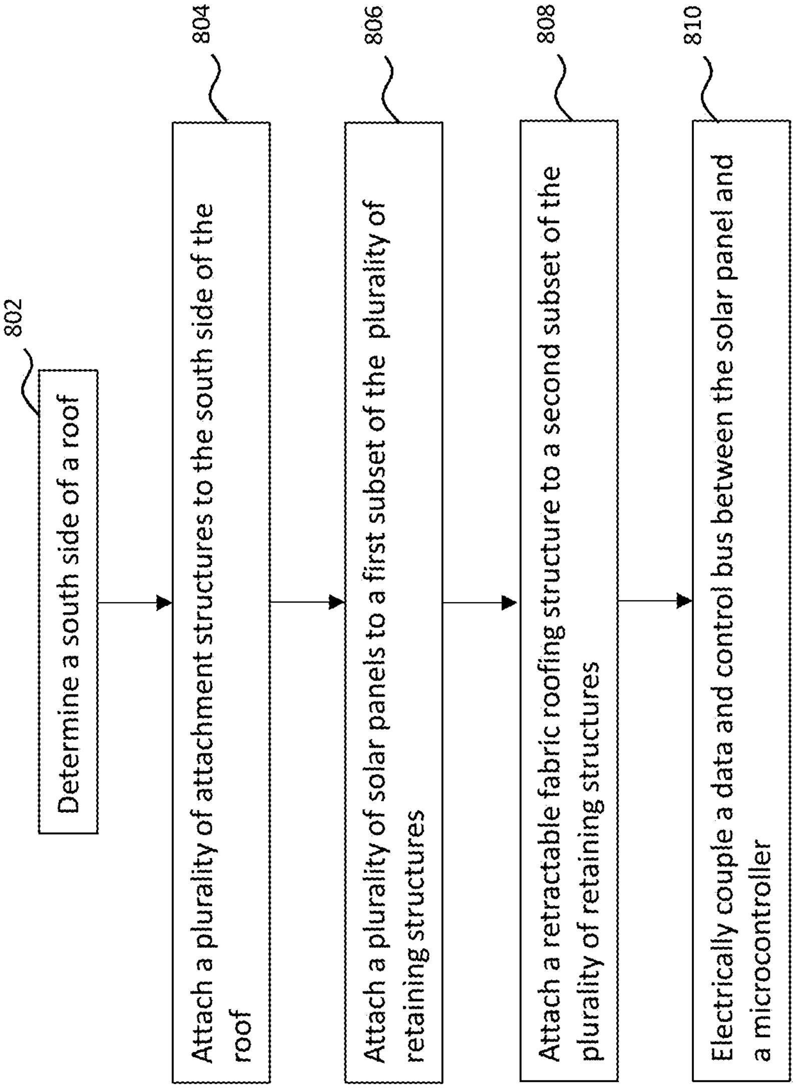
FIG. 8 illustrates a flow chart of a method of installing a retractable roofing system, according to aspects of the present disclosure.

FIG. 8 illustrates a flow chart of a method of installing a retractable roofing system, according to aspects of the present disclosure.

Referring to FIG. 8, a method of installing a roofing system includes determining a south side of a roof suitable for installation (802), attaching a plurality of attachment structures to the south side of the roof (804), attaching a plurality of solar panels to a first subset of the plurality of retaining structures (806), attaching a retractable fabric roofing structure to a second subset of the plurality of retaining structures (808), and electrically coupling a data and control bus between the solar panel and a microcontroller (810).

The method further includes programming a microcontroller to control the extension and retraction of the extensible tensioned fabric based on data received from a weather sensor.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of operating a roofing system mounted on a roof, the method comprising:

- determining, by a light sensor coupled to a microcontroller, whether sunlight is detected, the light sensor configured to detect sunlight intensity;
- determining, by a wind sensor coupled to the microcontroller, whether wind is detected, the wind sensor configured to detect wind speed;
- determining, by a temperature sensor coupled to the microcontroller, whether heat from the sun is detected;
- sending, from the microcontroller, in response to detecting both light and heat, a first control signal to an electric motor;
- in response to receiving the first control signal at the electric motor, actuating a roller to position an extensible tensioned fabric to an open position;
- sending, from the microcontroller, in response to detecting absence of both light and heat, a second control signal to the electric motor to retract the extensible tensioned fabric to a retracted position;
- sending, from the microcontroller, in response to detecting three or more wind gusts having wind velocity of more than 15 miles per hour within a minute, the second control signal to the electric motor to retract the extensible tensioned fabric to the retracted position, wherein the second control signal has a higher priority than the first control signal;
- in response to receiving the second control signal at the electric motor, actuating the electric motor to retract the extensible tensioned fabric into the roller in the retracted position, wherein, in the open position, the extensible tensioned fabric covers a portion of a south side of the roof without obstructing any windows or skylights, and wherein, in the retracted position, the portion of the south side of the roof remains exposed;
- wherein the roofing system comprises:
  - a housing configured to protect components of the roofing system;

the extensible tensioned fabric disposed in the housing;

the roller configured to regulate the extensible tensioned fabric within the housing in a retracted position and deploy the fabric in an open position;

the electric motor disposed in the housing and configured to actuate the operation of the roller;

the microcontroller configured to control the operation of the electric motor based on the detected sunlight intensity, send the first control signal to the electric motor to extend the fabric to the open position when the detected sunlight intensity is above a predetermined light threshold, and send the second control signal to the electric motor to retract the fabric to a retracted position when the detected sunlight intensity is below the predetermined light threshold;

wherein the microcontroller is further configured to send the second control signal to the electric motor to retract the fabric to a retracted position when the detected wind speed is above 10 miles per hour;

a rain sensor configured to detect rainfall, wherein the microcontroller is further configured to send the second control signal to the electric motor to retract the fabric to a retracted position when the rain sensor detects rain;

the light sensor, and the temperature sensor disposed in the housing; a retaining structure designed to keep the fabric secure and stable in the open position;

a solar panel positioned adjacent to the housing, configured to capture solar energy and convert it into electrical power; and a data and control bus coupled between the solar panel and the microcontroller.

2. The method of claim 1, wherein the extensible tensioned fabric is made of a material selected from the group consisting of Polyvinyl Chloride (PVC) Coated Polyester, Polytetrafluoroethylene (PTFE) Coated Fiberglass, Ethylene Tetrafluoroethylene (ETFE), and High-Density Polyethylene (HDPE).

3. The method of claim 1, wherein the extensible tensioned fabric has a porosity range of approximately 10% to 60%.

4. The method of claim 3, wherein the extensible tensioned fabric has a porosity of 10% to 20%.

5. The method of claim 1, wherein the light sensor is configured to detect sunlight intensity and wherein the first control signal is generated and transmitted to the electric motor to extend the fabric to the open position when the light sensor detects more than 2000 Lux and wherein the second control signal is generated and transmitted to the electric motor to retract the fabric to the retracted position when the light sensor detects light less than 2000 Lux.

6. The method of claim 1, further comprising a step of receiving, by the microcontroller, a user input signal indicating a user preference for the position of the fabric, the microcontroller being further configured to override the first and second control signals based on the user input signal.

7. The method of claim 1, further comprising sending a schedule control signal to the electric motor to extend the fabric to the open position at predetermined times of the day, the schedule control signal has a higher priority than the first control signal.

8. The method of claim 1, further comprising, at the light sensor, detecting sunlight intensity and wherein the first control signal is generated and transmitted to the electric motor to extend the fabric to the open position when the light sensor detects more than a predetermined intensity level, and wherein the second control signal is generated and transmitted to the electric motor to retract the fabric to the retracted position when the light sensor detects light less than the predetermined intensity level, wherein the predetermined intensity level is adjustable based on user preferences or seasonal changes.

9. The method of claim 1, further comprising, at the temperature sensor, detecting ambient temperature, wherein the first control signal is generated and transmitted to the electric motor to extend the fabric to the open position when the temperature sensor detects more than a predetermined temperature, and wherein the second control signal is generated and transmitted to the electric motor to retract the fabric to the retracted position when the temperature sensor detects the ambient temperature is less than the predetermined temperature, wherein the predetermined temperature is adjustable based on user preferences or seasonal changes.

10. A method of operating a roofing system mounted on a south side of a roof, the method comprising:

determining, by a light sensor coupled to a microcontroller, whether sunlight intensity is above 2000 Lux;

determining, by a wind sensor coupled to the microcontroller, whether wind speed is below 10 miles per hour;

determining, by a temperature sensor coupled to the microcontroller, whether ambient temperature is between 40° F. and 120° F.;

sending, from the microcontroller, in response to detecting sunlight intensity above 2000 Lux, wind speed below 10 miles per hour, and ambient temperature between 40° F. and 120° F., a first control signal to an electric motor;

in response to receiving the first control signal at the electric motor, actuating a roller to position an extensible tensioned fabric to an open position from a retracted position, wherein, in the open position, the extensible tensioned fabric covers a portion of the roof without obstructing any windows or skylights, wherein, in the retracted position, the portion of the roof remains exposed, wherein the extensible tensioned fabric is configured to block a fraction of direct heat reaching a roofline of the roof while providing ventilation, wherein the extensible tensioned fabric has a porosity in a range of 10% to 20%, wherein the extensible tensioned fabric is made of a material selected from the group consisting of Polyvinyl Chloride (PVC) Coated Polyester, Polytetrafluoroethylene (PTFE) Coated Fiberglass, Ethylene Tetrafluoroethylene (ETFE), and High-Density Polyethylene (HDPE); and powering the electric motor using electrical energy from a solar panel electrically coupled to the microcontroller via a data and control bus.

11. The method of claim 10, further comprising:

sending, from the microcontroller, in response to detecting at least one of sunlight intensity below 1000 Lux, wind speed above 15 miles per hour, or ambient temperature outside a range of 40° F. to 120° F., a second control signal to the electric motor to retract the extensible tensioned fabric to a retracted position.

12. The method of claim 11, further comprising:

sending, from the microcontroller, in response to detecting three or more wind gusts having wind velocity of more than 15 miles per hour within a minute, the second control signal to the electric motor to retract the extensible tensioned fabric to the retracted position, wherein the second control signal has a higher priority than the first control signal.

13. The method of claim 10, further comprising:

receiving, by the microcontroller, a user input signal from a smartphone application indicating a user preference for the position of the extensible tensioned fabric; and overriding, by the microcontroller, the first control signal based on the user input signal to control the position of the extensible tensioned fabric according to the user preference.

14. The method of claim 10, further comprising: sending, from the microcontroller, a schedule control signal to the electric motor to extend the extensible tensioned fabric to the open position at predetermined times of the day based on a calendar schedule, wherein the schedule control signal has a higher priority than the first control signal; automatically adjusting, by the microcontroller, the predetermined times in the calendar schedule based on seasonal changes in sunrise and sunset times; and overriding, by the microcontroller, the first control signal and the schedule control signal based on a user input signal received from a smartphone application.

* * * * *